(12) United States Patent
Sugita

(10) Patent No.: US 10,115,524 B2
(45) Date of Patent: Oct. 30, 2018

(54) MULTILAYER CERAMIC CAPACITOR AND MANUFACTURING METHOD THEREOF

(71) Applicant: Murata Manufacturing Co., Ltd., Nagaokakyo-shi, Kyoto-fu (JP)

(72) Inventor: Hiroaki Sugita, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 15/586,320

(22) Filed: May 4, 2017

(65) Prior Publication Data

US 2017/0330686 A1 Nov. 16, 2017

(30) Foreign Application Priority Data

May 11, 2016 (JP) ................. 2016-095355

(51) Int. Cl.
*H01G 4/012* (2006.01)
*H01G 4/008* (2006.01)
*H01G 4/30* (2006.01)
*H01G 4/10* (2006.01)
*H01G 4/12* (2006.01)
*H01G 4/232* (2006.01)

(52) U.S. Cl.
CPC ............ *H01G 4/30* (2013.01); *H01G 4/0085* (2013.01); *H01G 4/012* (2013.01); *H01G 4/10* (2013.01); *H01G 4/1209* (2013.01); *H01G 4/2325* (2013.01); *H01G 4/12* (2013.01)

(58) Field of Classification Search
CPC ......... H01G 4/30; H01G 4/008; H01G 4/0085
See application file for complete search history.

(56) References Cited

U.S. PATENT DOCUMENTS

| 2014/0301014 | A1 | 10/2014 | Kim |
| 2016/0042865 | A1* | 2/2016 | Hong ............. H01G 4/12 361/301.4 |
| 2016/0268047 | A1* | 9/2016 | Shin ............. H01G 4/12 |
| 2017/0186541 | A1* | 6/2017 | Hong ............. H01G 4/30 |
| 2017/0352482 | A1* | 12/2017 | Park ............. H01G 4/228 |

FOREIGN PATENT DOCUMENTS

| JP | 62-237714 A | 10/1987 |
| KR | 10-2010-0136917 A | 12/2010 |
| KR | 10-2014-0121728 A | 10/2014 |

OTHER PUBLICATIONS

Official Communication issued in Korean Patent Application No. 10-2017-0058146, dated Aug. 16, 2018.

* cited by examiner

*Primary Examiner* — Eric Thomas
(74) *Attorney, Agent, or Firm* — Keating & Bennett, LLP

(57) ABSTRACT

In a width direction of a ceramic laminate, one end portion of a first internal electrode and one end portion of a second internal electrode each include metal phases of a Ni region, a Ni—O region, and a Ni—O—Mg region disposed in this order from a first internal electrode side and a second internal electrode side, respectively, to a first side surface of the ceramic laminate. The other end portion of the first internal electrode and the other end portion of the second internal electrode each include metal phases of a Ni region, a Ni—O region, and a Ni—O—Mg region disposed in this order from the first internal electrode side and the second internal electrode side, respectively, to a second side surface of the ceramic laminate.

18 Claims, 5 Drawing Sheets

MULTILAYER CERAMIC CAPACITOR AND MANUFACTURING METHOD THEREOF

CROSS REFERENCE TO RELATED APPLICATIONS

This application claims the benefit of priority to Japanese Patent Application No. 2016-095355 filed on May 11, 2016. The entire contents of this application are hereby incorporated herein by reference.

BACKGROUND OF THE INVENTION

1. Field of the Invention

The present invention relates to a multilayer ceramic capacitor and a manufacturing method thereof.

2. Description of the Related Art

Heretofore, a multilayer ceramic capacitor has been known which has the structure disclosed in Japanese Unexamined Patent Application Publication No. 62-237714 and which can increase an acquisition efficiency of electrostatic capacitance. This multilayer ceramic capacitor includes a ceramic laminate formed by laminating a plurality of ceramic dielectric layers each including a surface on which a first internal electrode is provided, a plurality of ceramic dielectric layers each including a surface on which a second internal electrode is provided, and a plurality of ceramic dielectric layers provided with no internal electrodes. The first internal electrode and the second internal electrode face each other with the corresponding ceramic dielectric layer interposed therebetween.

In addition, this multilayer ceramic capacitor is formed in such a way that after end portions of the first internal electrodes and end portions of the second internal electrodes in a width direction are exposed to side surfaces of the ceramic laminate, the side surfaces thereof are each covered with a covering ceramic dielectric layer.

Incidentally, in the case of a multilayer ceramic capacitor, the insulating property between a first internal electrode and a second internal electrode is required to be secured. However, in the case of the multilayer ceramic capacitor including the structure disclosed in Japanese Unexamined Patent Application Publication No. 62-237714, although the electric field is liable to be concentrated on the end portion of the first internal electrode in the width direction and the end portion of the second internal electrode in the width direction, the creepage distance between the end portions of the above two types of internal electrodes corresponds only to the thickness of the ceramic dielectric layer, and as a result, the end portions described above are close to each other. Hence, the end portion of the first internal electrode and the end portion of the second internal electrode may be disadvantageously short-circuited to each other in some cases.

SUMMARY OF THE INVENTION

Preferred embodiments of the present invention provide multilayer ceramic capacitors which prevent short circuiting between an end portion of a first internal electrode and an end portion of a second internal electrode and in which microcracks are not likely to be generated in a boundary portion between a ceramic dielectric layer and a covering ceramic dielectric layer and manufacturing methods of such multilayer ceramic capacitors.

According to a preferred embodiment of the present invention, a multilayer ceramic capacitor includes a ceramic laminate in which a plurality of ceramic dielectric layers each including a surface on which a first internal electrode is provided, a plurality of ceramic dielectric layers each including a surface on which a second internal electrode is provided, and a plurality of ceramic dielectric layers provided with no internal electrodes are laminated to each other, the ceramic laminate including a first main surface and a second main surface facing each other in a lamination direction, a first side surface and a second side surface facing each other in a width direction perpendicular or substantially perpendicular to the lamination direction, and a first end surface and a second end surface facing each other in a length direction perpendicular or substantially perpendicular to the lamination direction and the width direction; in the width direction of the ceramic laminate, a first covering ceramic dielectric layer provided on the first side surface of the ceramic laminate to which one end portion of the first internal electrode and one end portion of the second internal electrode are exposed and a second covering ceramic dielectric layer provided on the second side surface of the ceramic laminate to which the other end portion of the first internal electrode and the other end portion of the second internal electrode are exposed; and a first external electrode provided on the first end surface of the ceramic laminate to which the first internal electrode is exposed and a second external electrode provided on the second end surface of the ceramic laminate to which the second internal electrode is exposed. In the multilayer ceramic capacitor described above, the first internal electrode and the second internal electrode face each other with the corresponding ceramic dielectric layer interposed therebetween; in the width direction of the ceramic laminate, the one end portion of the first internal electrode includes metal phases of Ni, Ni—O, and Ni—Mg—O arranged in this order from a first internal electrode side to the first side surface of the ceramic laminate, and the other end portion of the first internal electrode includes metal phases of Ni, Ni—O, and Ni—Mg—O arranged in this order from the first internal electrode side to the second side surface of the ceramic laminate; and in the width direction of the ceramic laminate, the one end portion of the second internal electrode includes metal phases of Ni, Ni—O, and Ni—Mg—O arranged in this order from a second internal electrode side to the first side surface of the ceramic laminate, and the other end portion of the second internal electrode includes metal phases of Ni, Ni—O, and Ni—Mg—O arranged in this order from the second internal electrode side to the second side surface of the ceramic laminate.

In addition, in a multilayer ceramic capacitor according to a preferred embodiment of the present invention, in the width direction of the ceramic laminate, the one end portion of the first internal electrode and the one end portion of the second internal electrode are each arranged within a displacement of approximately 5 μm or less, for example, along the lamination direction, and the other end portion of the first internal electrode and the other end portion of the second internal electrode are each arranged within a displacement of approximately 5 μm or less, for example, along the lamination direction.

In addition, according to another preferred embodiment of the present invention, a method for manufacturing a multilayer ceramic capacitor includes a step of forming a ceramic laminate in which a plurality of ceramic dielectric layers each including a surface on which a first internal electrode is provided, a plurality of ceramic dielectric layers each including a surface on which a second internal electrode is provided, and a plurality of ceramic dielectric layers provided with no internal electrodes are laminated to each other, the ceramic laminate including a first main surface and a second main surface facing each other in a lamination direction, a first side surface and a second side surface facing each other in a width direction perpendicular or substantially perpendicular to the lamination direction, and a first end surface and a second end surface facing each other in a length direction perpendicular or substantially perpendicular to the lamination direction and the width direction; a step of forming a first covering ceramic dielectric layer on the first side surface of the ceramic laminate and a second covering ceramic dielectric layer on the second side surface of the ceramic laminate; a step of firing the ceramic laminate; and a step of forming a first external electrode on the first end surface of the ceramic laminate and a second external electrode on the second end surface of the ceramic laminate. In the multilayer ceramic capacitor thus manufactured, the first internal electrode and the second internal electrode face each other with the corresponding ceramic dielectric layer interposed therebetween; in the width direction of the ceramic laminate, one end portion of the first internal electrode and one end portion of the second internal electrode are each exposed to the first side surface of the ceramic laminate, and the other end portion of the first internal electrode and the other end portion of the second internal electrode are each exposed to the second side surface of the ceramic laminate; and the first internal electrode is exposed to the first end surface of the ceramic laminate, and the second internal electrode is exposed to the second end surface of the ceramic laminate.

In addition, the step of firing a ceramic laminate preferably further includes steps of first heating, in a temperature range of approximately 1,100° C. or less and in a $N_2$ atmosphere, the ceramic laminate at a temperature increase rate of approximately 300° C./min to approximately 1,000° C./min for approximately 1.1 minutes to approximately 3.7 minutes, after first heating, second heating the ceramic laminate at a temperature increase rate of approximately 5° C./min to approximately 30° C./min for approximately 8 minutes to approximately 50 minutes, in a temperature range of approximately 1,100° C. to approximately 1,350° C. and in a reducing atmosphere in a range of approximately 0.1 orders to approximately 2 orders of magnitude of a Ni—NiO equilibrium oxygen partial pressure, and after second heating, keeping the ceramic laminate for approximately 1 minute to approximately 30 minutes, in a temperature range of approximately 1,150° C. to approximately 1,350° C. and in a reducing atmosphere in a range of approximately 0.1 orders to approximately 2 orders of magnitude of a Ni—NiO equilibrium oxygen partial pressure, for example.

In addition, in a method for manufacturing a multilayer ceramic capacitor according to a preferred embodiment of the present invention, the first internal electrode and the second internal electrode each include Ni, and the first covering ceramic dielectric layer and the second covering ceramic dielectric layer each include Mg.

According to various preferred embodiments of the present invention, multilayer ceramic capacitors prevent short circuiting between the end portion of the first internal electrode and the end portion of the second internal electrode and microcracks are not likely to be generated in the boundary portion between the ceramic dielectric layer and the covering ceramic dielectric layer.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
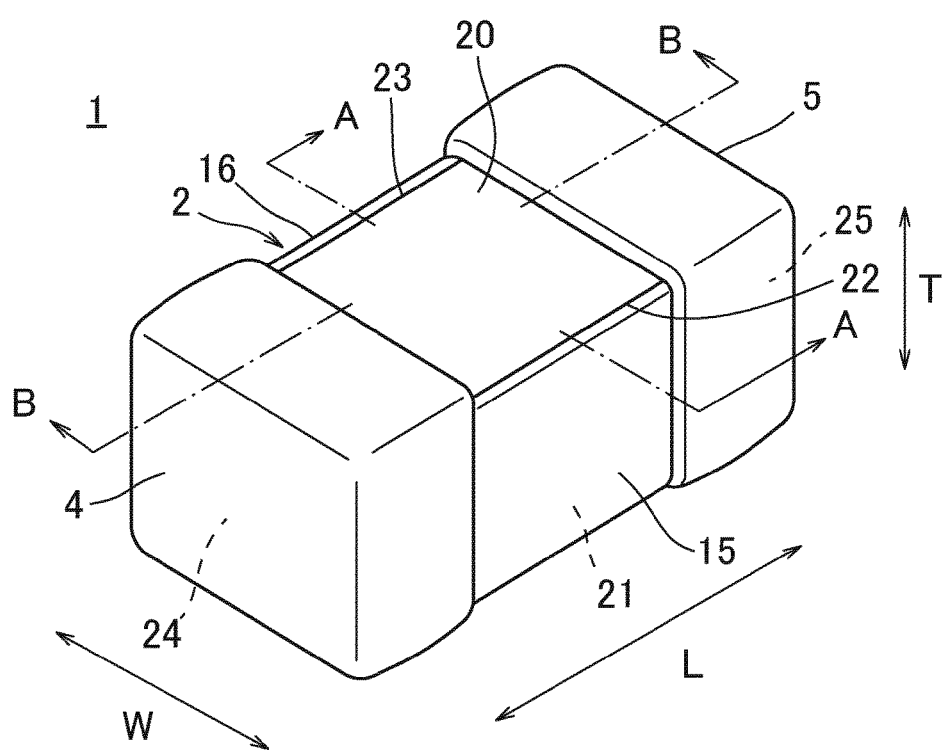
FIG. 1 is an appearance perspective view showing a multilayer ceramic capacitor according to a preferred embodiment of the present invention.
Figure 2:
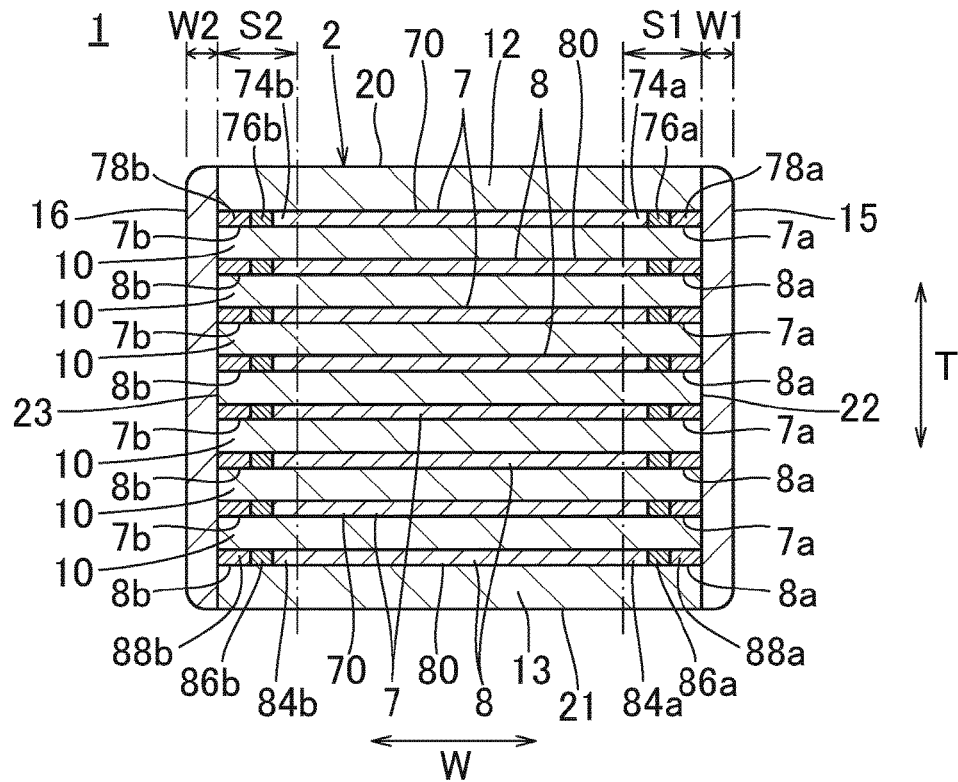
FIG. 2 is a cross-sectional view taken along the line II-II of FIG. 1.
Figure 3:
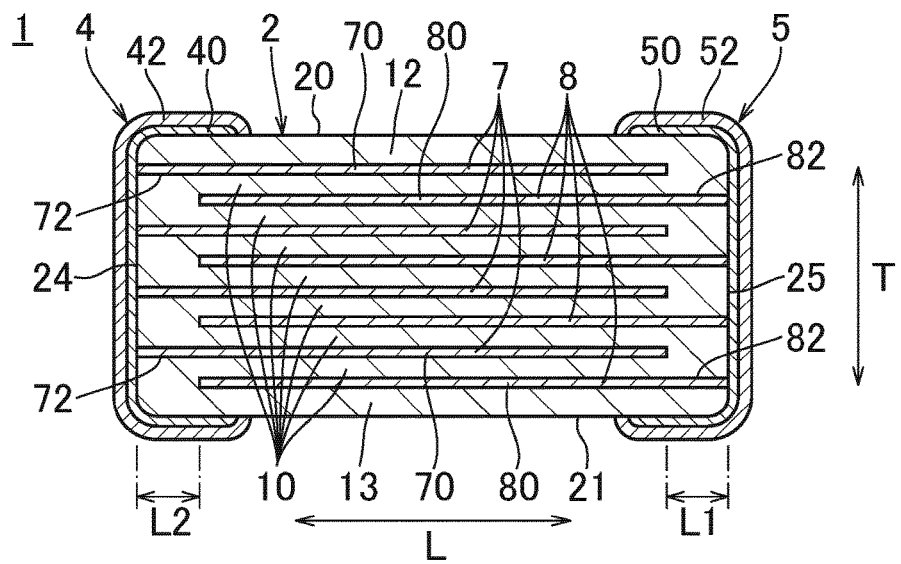
FIG. 3 is a cross-sectional view taken along the line III-III of FIG. 1.

Multilayer ceramic capacitors according to preferred embodiments of the present invention will be described. FIG. 1 is an appearance perspective view of a multilayer ceramic capacitor 1. FIG. 2 is a cross-sectional view taken along the line II-II of FIG. 1 and shows a cross-section (hereinafter called a WT cross-section) of the multilayer ceramic capacitor 1 in a width direction W and a lamination direction T. FIG. 3 is a cross-sectional view taken along the line III-III of FIG. 1 and shows a cross-section (hereinafter called an LT cross-section) of the multilayer ceramic capacitor 1 in a length direction L and the lamination direction T.

The multilayer ceramic capacitor 1 includes a ceramic laminate 2, a first external electrode 4 located on an external surface of one end portion of the ceramic laminate 2, a second external electrode 5 located on an external surface of the other end portion of the ceramic laminate 2, a first covering ceramic dielectric layer 15 located on an external surface of one side portion of the ceramic laminate 2, and a second covering ceramic dielectric layer 16 located on an external surface of the other end portion of the ceramic laminate 2.

The ceramic laminate 2 is formed preferably by laminating a plurality of ceramic dielectric layers 10 each including a surface on which a first internal electrode 7 is provided, a plurality of ceramic dielectric layers 10 each including a surface on which a second internal electrode 8 is provided, a first external ceramic dielectric layer 12, and a second external ceramic dielectric layer 13, the first and the second external ceramic dielectric layers being provided with no internal electrodes. The ceramic laminate 2 includes a first main surface 20 and a second main surface 21 facing each other in the lamination direction T, a first side surface 22 and a second side surface 23 facing each other in the width direction W perpendicular or substantially perpendicular to the lamination direction T, and a first end surface 24 and a second end surface 25 facing each other in the length direction L perpendicular or substantially perpendicular to the lamination direction T and the width direction W.

Furthermore, corner portions and ridge-line portions of the ceramic laminate 2 are preferably rounded. The corner portion is a portion at which three planes of the ceramic laminate 2 are intersected to each other, and the ridge-line portion is a portion at which two planes of the ceramic laminate 2 are intersected to each other.

The size of the ceramic laminate 2 preferably is approximately 0.2 mm to approximately 0.8 mm in the lamination direction T, approximately 0.2 mm to approximately 1.6 mm in the length direction L, and approximately 0.2 mm to approximately 0.8 mm in the width direction W, for example. The size of the ceramic laminate 2 can be measured by a micrometer or an optical microscope.

The ceramic dielectric layers of the ceramic laminate 2 include the ceramic dielectric layers 10 laminated to each other in the lamination direction T of the ceramic laminate 2, the first external ceramic dielectric layer 12, and the second external ceramic dielectric layer 13, the external ceramic dielectric layers 12 and 13 being provided on the top and the bottom of the ceramic dielectric layers 10, respectively, so as to sandwich the ceramic dielectric layers 10 laminated to each other.

As a material of the ceramic dielectric layer 10, the first external ceramic dielectric layer 12, and the second external ceramic dielectric layer 13, for example, a dielectric ceramic containing $BaTiO_3$, $CaTiO_3$, $SrTiO_3$, $CaZrO_3$, or the like as a primary component may be used.

The total number of the ceramic dielectric layers 10, the first external ceramic dielectric layer 12, and the second external ceramic dielectric layer 13 is preferably approximately 100 to approximately 900, for example. The thickness of the ceramic dielectric layer 10 defining and functioning as an internal layer is preferably approximately 0.5 µm to approximately 1 µm, for example. The thicknesses of the first external ceramic dielectric layer 12 and the second external ceramic dielectric layer 13 are each preferably approximately 15 µm to approximately 40 µm, for example.

The first internal electrode 7 has a substantially rectangular shape and includes a counter electrode portion 70 facing the second internal electrode 8 and a lead electrode portion 72 extending from the counter electrode portion 70 to the first end surface 24 of the ceramic laminate 2. The second internal electrode 8 has a substantially rectangular shape and includes a counter electrode portion 80 facing the first internal electrode 7 and a lead electrode portion 82 extending from the counter electrode portion 80 to the second end surface 25 of the ceramic laminate 2.

As shown in FIG. 3, in the length direction L of the ceramic laminate 2, between the counter electrode portion 70 and the second end surface 25 of the ceramic laminate 2, a gap L1 is provided. Between the counter electrode portion 80 and the first end surface 24 of the ceramic laminate 2, a gap L2 is provided. In addition, since the counter electrode portion 70 and the counter electrode portion 80 face each other with the ceramic dielectric layer 10 interposed therebetween, an electrostatic capacitance is generated.

As shown in FIG. 2, in the width direction W of the ceramic laminate 2, one end portion 7a of the first internal electrode 7 extends to the first side surface 22 of the ceramic laminate 2, and a front end of the end portion 7a is exposed to the first side surface 22. The other end portion 7b of the first internal electrode 7 extends to the second side surface 23 of the ceramic laminate 2, and a front end of the other end portion 7b is exposed to the second side surface 23. As is the case described above, one end portion 8a of the second internal electrode 8 extends to the first side surface 22 of the ceramic laminate 2, and a front end of the end portion 8a is exposed to the first side surface 22. The other end portion 8b of the second internal electrode 8 extends to the second side surface 23 of the ceramic laminate 2, and a front end of the other end portion 8b is exposed to the second side surface 23.

The one end portion 7a of the first internal electrode 7 and the one end portion 8a of the second internal electrode 8 are disposed so that in the width direction W of the ceramic laminate 2, the displacement therebetween along the lamination direction T is reduced to approximately 5 µm or less, for example. The other end portion 7b of the first internal electrode 7 and the other end portion 8b of the second internal electrode 8 are disposed so that in the width direction W of the ceramic laminate 2, the displacement therebetween along the lamination direction T is reduced to approximately 5 µm or less, for example.

In this case, the one end portion 7a of the first internal electrode 7 is located within approximately 10 µm, for example, from the front end of the one end portion 7a. The one end portion 8a of the second internal electrode 8 is located within approximately 10 µm, for example, from the front end of the one end portion 8a. Hence, in this preferred embodiment, the regions of the end portion 7a and the end portion 8a each extend from the first side surface 22 of the ceramic laminate 2 to a distance S1 of approximately 10 µm toward the inside thereof, for example. As is the case described above, the other end portion 7b of the first internal electrode 7 is located within approximately 10 µm from the front end of the other end portion 7b, for example. The other end portion 8b of the second internal electrode 8 is located within approximately 10 µm from the front end of the other end portion 8b, for example. Hence, in this preferred embodiment, the regions of the other end portion 7b and the other end portion 8b each extend from the second side surface 23 of the ceramic laminate 2 to a distance S2 of approximately 10 µm toward the inside thereof, for example.

As a material of the first internal electrode 7 and the second internal electrode 8, Ni or an alloy containing Ni as a primary component is used. In addition, from the first internal electrode 7 side to the first side surface 22 of the ceramic laminate 2, the one end portion 7a of the first internal electrode 7 includes metal phases of a Ni region 74a, a Ni—O region 76a, and a Ni—Mg—O region 78a disposed in this order. From the first internal electrode 7 side to the second side surface 23 of the ceramic laminate 2, the other end portion 7b of the first internal electrode 7 includes metal phases of a Ni region 74b, a Ni—O region 76b, and a Ni—Mg—O region 78b disposed in this order. As is the case described above, from the second internal electrode 8 side to the first side surface 22 of the ceramic laminate 2, the one end portion 8a of the second internal electrode 8 includes metal phases of a Ni region 84a, a Ni—O region 86a, and a Ni—Mg—O region 88a disposed in this order. From the second internal electrode 8 side to the second side surface 23 of the ceramic laminate 2, the other end portion 8b of the second internal electrode 8 includes metal phases of a Ni region 84b, a Ni—O region 86b, and a Ni—Mg—O region 88b disposed in this order.

In the multilayer ceramic capacitor 1, since the one end portion 7a and the other end portion 7b of the first internal electrode 7 and the one end portion 8a and the other end portion 8b of the second internal electrode 8 each include the metal phases including the structure described above, the insulating property between the one end portion 7a and the one end portion 8a and the insulating property between the other end portion 7b and the other end portion 8b is able to be secured. In particular, in the width direction W of the ceramic laminate 2, when the lengths of the Ni—Mg—O region 78a, the Ni—Mg—O region 78b, the Ni—Mg—O region 88a, and the Ni—Mg—O region 88b are each approximately 0.5 μm to approximately 1 μm, for example, the insulating property between the one end portion 7a and the one end portion 8a and the insulating property between the other end portion 7b and the other end portion 8b is improved. In addition, the lengths of the Ni—Mg—O region 78a, the Ni—Mg—O region 78b, the Ni—Mg—O region 88a, and the Ni—Mg—O region 88b can be analyzed by a field emission type wave-dispersive X-ray spectrometer (FE-WDX). In addition, by the use of a general scanning electron microscope (SEM), the length can also be analyzed using two images, that is, a secondary electron image and a backscattered electron image.

Furthermore, since the Ni—Mg—O region 78a and the Ni—Mg—O region 88a, each of which is the metal phase, adjust the volume expansion by controlling firing conditions, generation of microcracks at a boundary portion between the ceramic dielectric layer 10 and the first covering ceramic dielectric layer 15 is significantly reduced or prevented, and in addition, since the Ni—Mg—O region 78b and the Ni—Mg—O region 88b expand in volume, generation of microcracks at a boundary portion between the ceramic dielectric layer 10 and the second covering ceramic dielectric layer 16 is also significantly reduced or prevented.

The first internal electrode 7 and the second internal electrode 8 may further include dielectric particles including the same composition system as that of the ceramic contained in the ceramic dielectric layer 10, the first external ceramic dielectric layer 12, and the second external ceramic dielectric layer 13. The thicknesses of the first internal electrode 7 and the second internal electrode 8 are each preferably approximately 0.3 μm to approximately 2.0 μm, for example. The total number of the first internal electrodes 7 and the second internal electrodes 8 is preferably approximately 50 to approximately 850, for example.

The first covering ceramic dielectric layer 15 is located on the first side surface 22 of the ceramic laminate 2 and covers the front end of the one end portion 7a of the first internal electrode 7 and the front end of the one end portion 8a of the second internal electrode 8, each of which is exposed to the first side surface 22. Hence, as shown in FIG. 2, in the width direction W of the ceramic laminate 2, between the outside of the multilayer ceramic capacitor 1 and each of the one end portion 7a of the first internal electrode 7 and the one end portion 8a of the second internal electrode 8, a gap W1 corresponding to the thickness of the first covering ceramic dielectric layer 15 is provided. Hence, the one end portion 7a of the first internal electrode 7 and the one end portion 8a of the second internal electrode 8 are reliably insulated from the outside by the gap W1 defined by the first covering ceramic dielectric layer 15.

In addition, the second covering ceramic dielectric layer 16 is located on the second side surface 23 of the ceramic laminate 2 and covers the front end of the other end portion 7b of the first internal electrode 7 and the front end of the other end portion 8b of the second internal electrode 8, each of which is exposed to the second side surface 23. Hence, in the width direction W of the ceramic laminate 2, between the outside of the multilayer ceramic capacitor 1 and each of the other end portion 7b of the first internal electrode 7 and the other end portion 8b of the second internal electrode 8, a gap W2 corresponding to the thickness of the second covering ceramic dielectric layer 16 is provided. Hence, the other end portion 7b of the first internal electrode 7 and the other end portion 8b of the second internal electrode 8 are reliably insulated from the outside by the gap W2 defined by the second covering ceramic dielectric layer 16.

In addition, since the gap W1 and the gap W2 are each preferably approximately 5 μm to approximately 40 μm, for example, the first covering ceramic dielectric layer 15 and the second covering ceramic dielectric layer 16 are each formed so as to have a thickness of approximately 5 μm to approximately 40 μm, for example.

As a material of the first covering ceramic dielectric layer 15 and the second covering ceramic dielectric layer 16, a dielectric ceramic containing as a primary component, $BaTiO_3$, $CaTiO_3$, $SrTiO_3$, $CaZrO_3$, or the like is used. In addition, a material in which an Mg compound is added as a subcomponent to the primary component described above is preferably used. In addition, when the material of the first covering ceramic dielectric layer 15 and the second covering ceramic dielectric layer 16 is the same as the material of the ceramic dielectric layer 10, the first external ceramic dielectric layer 12, and the second external ceramic dielectric layer 13, those layers are able to be fired under the same conditions in a firing step which will be described later, and furthermore, at the boundary portions of the first covering ceramic dielectric layer 15 and the second covering ceramic dielectric layer 16 with the ceramic dielectric layer 10, the first external ceramic dielectric layer 12, and the second external ceramic dielectric layer 13, an abnormal reaction may not occur.

The first external electrode 4 is located on the one end surface 24 of the ceramic laminate 2, and an end portion of the first external electrode 4 extends to the first main surface 20 and the second main surface 21 of the ceramic laminate 2 and an external surface of the first covering ceramic dielectric layer 15 and an external surface of the second covering ceramic dielectric layer 16. The second external electrode 5 is located on the other end surface 25 of the ceramic laminate 2, and an end portion of the second external electrode 5 extends to the first main surface 20 and the second main surface 21 of the ceramic laminate 2 and the external surface of the first covering ceramic dielectric layer 15 and the external surface of the second covering ceramic dielectric layer 16. The first external electrode 4 is bonded to the lead electrode portion 72 of the internal electrode 7 exposed to the first end surface 24 of the ceramic laminate 2. The second external electrode 5 is bonded to the lead electrode portion 82 of the internal electrode 8 exposed to the second end surface 25 of the ceramic laminate 2.

The first external electrode 4 includes an underlayer electrode layer 40 and a plating layer 42 located thereon. The second external electrode 5 includes an underlayer electrode layer 50 and a plating layer 52 located thereon.

The underlayer electrode layer 40 and the underlayer electrode layer 50 each include at least one of a fired layer, a resin layer, a thin-film layer, and the like. The fired layer includes a glass and a metal. The metal of the fired layer includes, for example, at least one selected from Cu, Ni, Ag, Pd, an Ag—Pd alloy, Au, and the like. The fired layer may include a plurality of layers. The fired layer is a layer formed preferably by firing an electrically conductive paste containing a glass and a metal applied on the end portion of the ceramic laminate 2. The fired layer may be simultaneously fired together with the ceramic laminate 2 or may be fired after the ceramic laminate 2 is fired. The thickness of the fired layer is preferably approximately 10 μm to approximately 50 μm at the thickest portion thereof, for example.

As a material of the plating layer 42 and the plating layer 52, for example, at least one selected from Cu, Ni, Ag, Pd, an Ag—Pd alloy, Au, and the like is used. The plating layer 42 and the plating layer 52 each may include a plurality of layers and each preferably include a two-layer structure containing a Ni plating layer and a Sn plating layer. The Ni plating layer prevents the underlayer electrode layer 40 and the underlayer electrode layer 50 from being corroded by solder to be used when the multilayer ceramic capacitor 1 is mounted. The Sn plating layer improves the wettability of solder to be used when the multilayer ceramic capacitor 1 is mounted, so that the multilayer ceramic capacitor 1 is easily mounted. The thickness of each plating layer is preferably approximately 5 μm to approximately 10 μm, for example.

Figure 4:
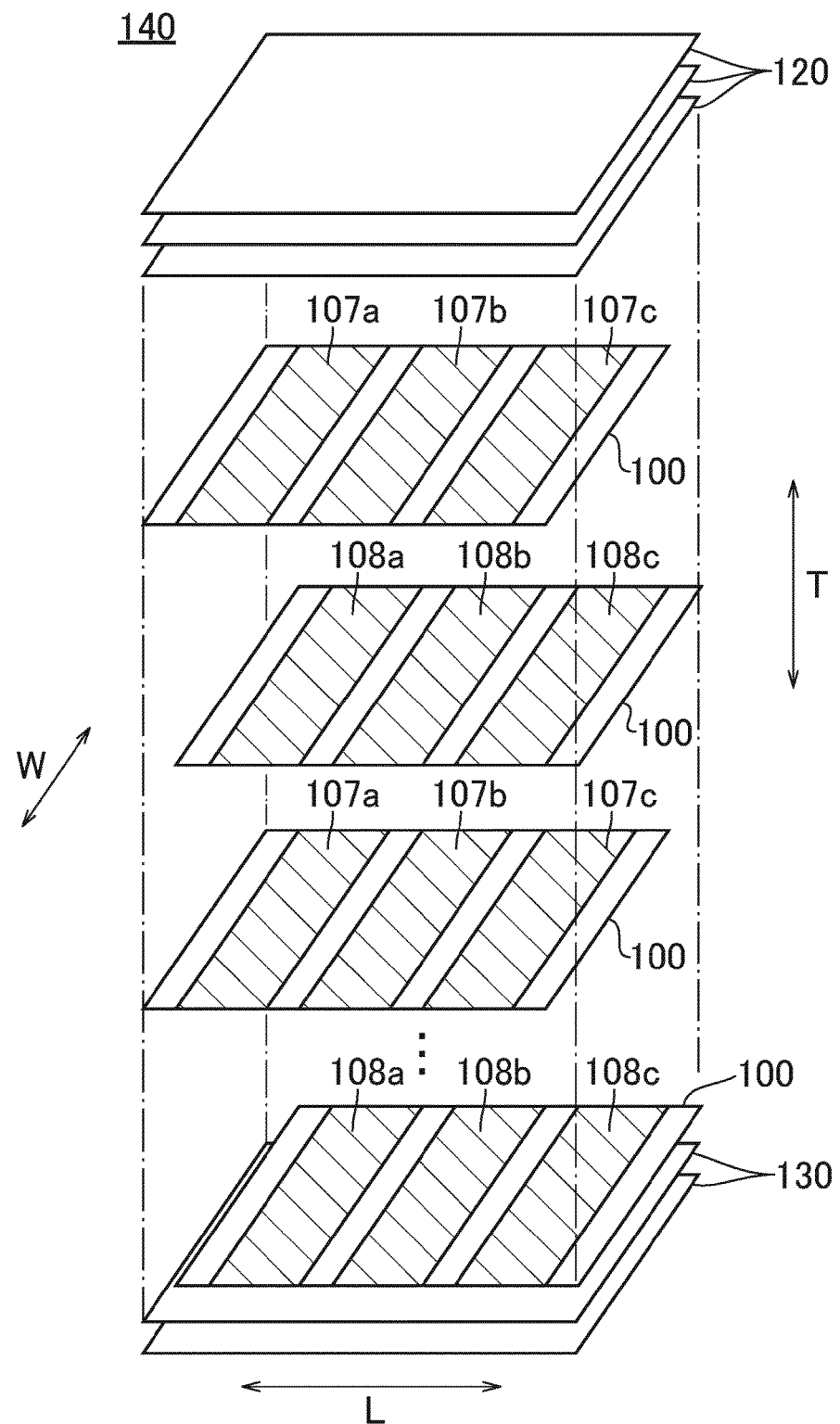
FIG. 4 is an exploded perspective view showing a method for manufacturing a multilayer ceramic capacitor according to a preferred embodiment of the present invention.

Next, a non-limiting example of a method for manufacturing a multilayer ceramic capacitor according to a preferred embodiment of the present invention will be described. In addition, hereinafter, the case in which the multilayer ceramic capacitor 1 is mass-produced will be described by way of example. In the case of the mass production, a mother ceramic laminate including a plurality of ceramic laminates 2 is manufactured. FIG. 4 is an exploded perspective view showing a mother ceramic laminate 140.

A ceramic dielectric slurry which is a raw material of the ceramic dielectric layer 10 is molded into a substantially sheet shape on a support film formed of a poly(ethylene terephthalate) (PET) or the like (not shown), so that mother ceramic dielectric green sheets 100 are formed. A ceramic dielectric slurry which is a raw material of the first external ceramic dielectric layer 12 is molded into a substantially sheet shape on a support film, so that first external mother ceramic dielectric green sheets 120 are formed. In addition, a ceramic dielectric slurry which is a raw material of the second external ceramic dielectric layer 13 is molded into a substantially sheet shape on a support film, so that second external mother ceramic dielectric green sheets 130 are formed.

As a method to obtain a substantially sheet shape by molding, various methods may be used, and a ceramic dielectric slurry may be molded into a substantially sheet shape by extrusion thereof from a coating head while a support film is moved. The thickness of the mother ceramic dielectric green sheet 100 and the thicknesses of the first external mother ceramic dielectric green sheet 120 and the second external mother ceramic dielectric green sheet 130 are each determined by a traveling speed of the support film and an extrusion amount of the ceramic dielectric slurry. After being applied on the support film, the ceramic dielectric slurry is dried in combination of atmospheric drying, freeze-drying, far infrared drying, and the like.

On the surface of the mother ceramic dielectric green sheet 100 which defines and functions as an internal layer, an electrically conductive paste containing Ni as an electrically conductive primary component is screen-printed into a stripe form. Accordingly, a mother ceramic dielectric green sheet 100 including a surface on which electrically conductive paste films 107a, 107b, and 107c, each of which is used as the first internal electrode 7, are disposed, is formed, and a mother ceramic dielectric green sheet 100 including a surface on which electrically conductive paste films 108a, 108b, and 108c, each of which is used as the second internal electrode 8, are disposed, is formed. As a printing method, various methods, such as screen printing, gravure printing, and ink jet printing, may be used.

Figure 5:
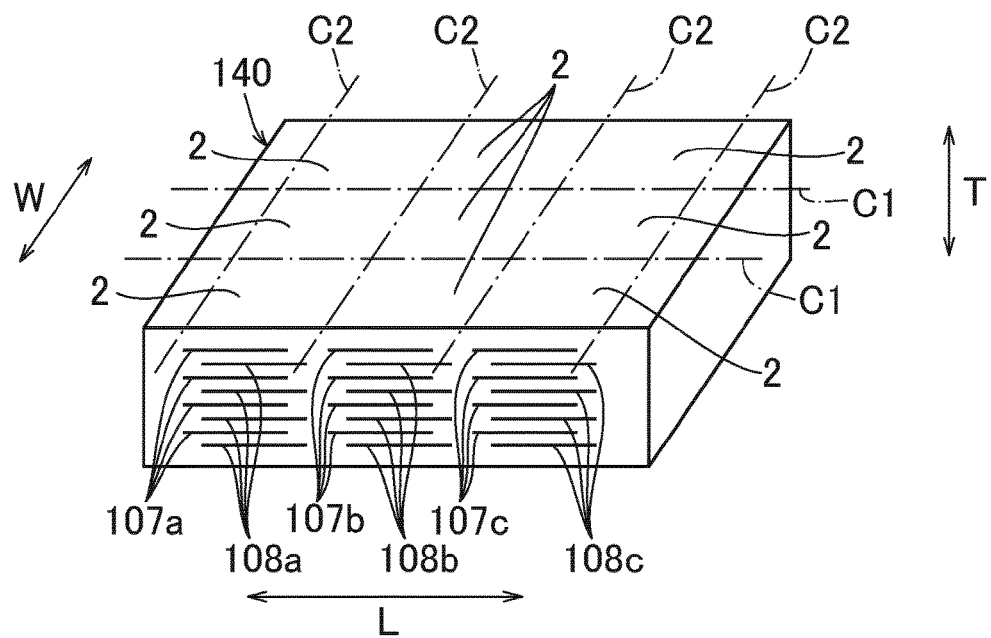
FIG. 5 is an appearance perspective view showing a manufacturing method following that shown in FIG. 4.

After the support films are peeled away, a plurality of mother ceramic dielectric green sheets 100 each including a surface on which the electrically conductive paste films 107a, 107b, and 107c are disposed and a plurality of mother ceramic dielectric green sheets 100 each including a surface on which the electrically conductive paste films 108a, 108b, and 108c are disposed, are laminated so as to be displaced from each other in the length direction L. Furthermore, a plurality of first external mother ceramic dielectric green sheets 120 from which the support films are peeled away and a plurality of second external mother ceramic dielectric green sheets 130 from which the support films are peeled away are laminated on the top and the bottom of the plurality of mother ceramic dielectric green sheets 100 thus laminated, respectively, so as to sandwich the above laminated dielectric green sheets 100. The laminate thus prepared is pressure-bonded by isostatic pressing or rigid body pressing, and as shown in FIG. 5, the mother ceramic laminate 140 is formed.

Figure 6:
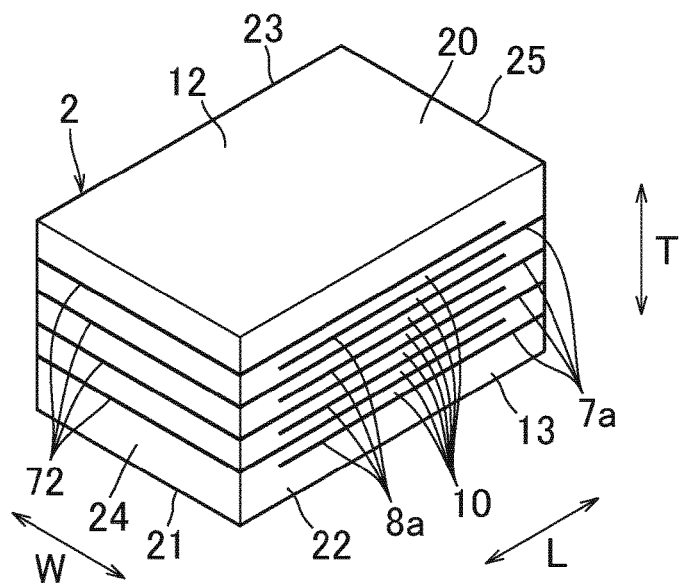
FIG. 6 is an appearance perspective view showing a manufacturing method following that shown in FIG. 5.

The mother ceramic laminate 140 is cut not only in the lamination direction T along a plurality of cutting lines C1 in parallel or substantially in parallel to the length direction L but also in the lamination direction T along a plurality of cutting lines C2 in parallel or substantially in parallel to the width direction W. Accordingly, as shown in FIG. 6, ceramic laminates 2 each including a predetermined size are formed by cutting. In the ceramic laminate 2, the front end of the one end portion 7a of the first internal electrode 7 in the width direction W and the front end of the one end portion 8a of the second internal electrode 8 in the width direction W are exposed to the first side surface 22. The front end of the other end portion 7b of the first internal electrode 7 in the width direction W and the front end of the other end portion 8b of the second internal electrode 8 in the width direction W are exposed to the second side surface 23. The lead electrode portion 72 of the first internal electrode 7 is exposed to the first end surface 24 of the ceramic laminate 2. The lead electrode portion 82 of the second internal electrode 8 is exposed to the second end surface 25 of the ceramic laminate 2.

Figure 7:
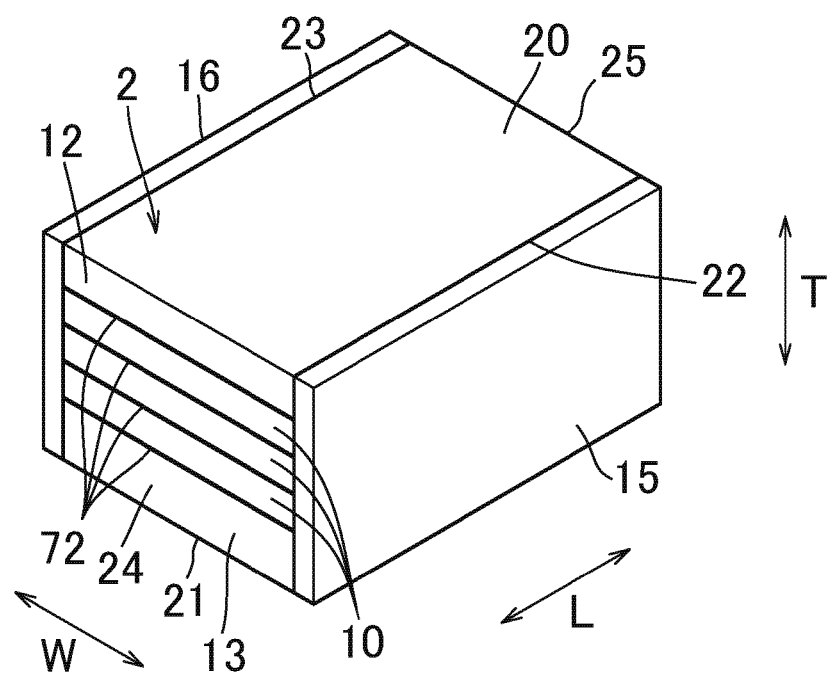
FIG. 7 is an appearance perspective view showing a manufacturing method following that shown in FIG. 6.

Next, as shown in FIG. 7, the first covering ceramic dielectric layer 15 is formed on the first side surface 22 so as to cover the front end of the one end portion 7a of the first internal electrode 7 and the front end of the one end portion 8a of the second internal electrode 8, each of which is exposed to the first side surface 22 of the ceramic laminate 2. In addition, the second covering ceramic dielectric layer 16 is formed on the second side surface 23 so as to cover the front end of the other end portion 7b of the first internal electrode 7 and the front end of the other end portion 8b of the second internal electrode 8, each of which is exposed to the second side surface 23 of the ceramic laminate 2. The first covering ceramic dielectric layer 15 and the second covering ceramic dielectric layer 16 are each formed by a method of adhering at least one covering ceramic dielectric green sheet or a method of applying a covering ceramic dielectric slurry. For the covering ceramic dielectric green sheet or the covering ceramic dielectric slurry, a material formed by adding an Mg compound as a subcomponent to the primary component of the dielectric ceramic is used, and in particular, a material in which Mg is added so that the content thereof is approximately more than 0.0 to less than 2.5 percent by mole is preferably used.

Next, the ceramic laminate 2 is processed by barrel polishing, so that the corner portions and the ridge-line portions of the ceramic laminate 2 are rounded. Subsequently, the ceramic laminate 2 is fired. In the ceramic laminate 2 before firing, the degree of oxidation of the first internal electrode 7 and that of the second internal electrode 8 are each preferably approximately 0%. The degree of oxidation of the first internal electrode 7 and that of the second internal electrode 8 are each measured by magnetization amount measurement. More particularly, after the magnetization amount of the ceramic laminate 2 is measured, this ceramic laminate 2 is processed by a reducing treatment, and the magnetization amount thereof is again measured. In addition, by comparison in magnetization amount before and after the reducing treatment, the degree of oxidation of the first internal electrode 7 and that of the second internal electrode 8 are measured.

In the firing, first, in a temperature range of approximately 1,100° C. or less and in an atmosphere in which a very small amount of air is charged into a $N_2$ gas, the ceramic laminate 2 is heated at a temperature increase rate of approximately 300° C./min to approximately 1,000° C./min for approximately 1.1 minutes to approximately 3.7 minutes. As a result, O contained in the first covering ceramic dielectric layer 15 reacts with Ni of an end surface of the one end portion 7a of the first internal electrode 7 exposed to the first side surface 22 of the ceramic laminate 2, so that from the first side surface 22 to the inside, a NiO region is generated and grown in a region including a predetermined length which is within the range of the one end portion 7a of the first internal electrode 7. In addition, O contained in the first covering ceramic dielectric layer 15 reacts with Ni of an end surface of the one end portion 8a of the second internal electrode 8 exposed to the first side surface 22 of the ceramic laminate 2, so that from the first side surface 22 to the inside, a NiO region is generated and grown in a region including a predetermined length which is within the range of the one end portion 8a of the second internal electrode 8.

In addition, O contained in the second covering ceramic dielectric layer 16 reacts with Ni of an end surface of the other end portion 7b of the first internal electrode 7 exposed to the second side surface 23 of the ceramic laminate 2, so that from the second side surface 23 of the ceramic laminate 2 to the inside thereof, a NiO region is generated and grown in a region including a predetermined length which is within the range of the other end portion 7b of the first internal electrode 7. Furthermore, O contained in the second covering ceramic dielectric layer 16 reacts with Ni of an end surface of the other end portion 8b of the second internal electrode 8 exposed to the second side surface 23 of the ceramic laminate 2, so that from the second side surface 23 to the inside, a NiO region is generated and grown in a region including a predetermined length which is within the range of the other end portion 8b of the second internal electrode 8.

Next, in a temperature range of approximately 1,100° C. to approximately 1,350° C. and in a reducing atmosphere in a range of approximately 0.1 to approximately 2 orders of magnitude of a Ni—NiO equilibrium oxygen partial pressure, the ceramic laminate 2 is heated at a temperature increase rate of approximately 5° C./min to approximately 30° C./min for approximately 8 minutes to approximately 50 minutes. Subsequently, in a temperature range of approximately 1,150° C. to approximately 1,350° C. and in a reducing atmosphere in a range of approximately 0.1 to approximately 2 orders of magnitude of a Ni—NiO equilibrium oxygen partial pressure, the ceramic laminate 2 is held for approximately 1 minute to approximately 30 minutes.

Accordingly, Mg contained in the first covering ceramic dielectric layer 15 reacts with NiO of the end surface of the one end portion 7a of the first internal electrode 7 exposed to the first side surface 22 of the ceramic laminate 2, so that from the first side surface 22 of the ceramic laminate 2 to the inside thereof, a Ni—Mg—O segregation region is generated and grown in a region including a predetermined length which is within the range of the NiO region of the one end portion 7a of the first internal electrode 7. As a result, the one end portion 7a of the first internal electrode 7 includes metal phases of a Ni region 74a, a Ni—O region 76a, and a Ni—Mg—O region 78a disposed in this order from the first internal electrode 7 side to the first side surface 22.

In addition, Mg contained in the first covering ceramic dielectric layer 15 reacts with NiO of the end surface of the one end portion 8a of the second internal electrode 8 exposed to the first side surface 22 of the ceramic laminate 2, so that from the first side surface 22 of the ceramic laminate 2 to the inside thereof, a Ni—Mg—O segregation region is generated and grown in a region including a predetermined length which is within the range of the NiO region of the one end portion 8a of the second internal electrode 8. As a result, the one end portion 8a of the second internal electrode 8 includes metal phases of a Ni region 84a, a Ni—O region 86a, and a Ni—Mg—O region 88a disposed in this order from the second internal electrode 8 side to the first side surface 22.

In addition, Mg contained in the second covering ceramic dielectric layer 16 reacts with NiO of the end surface of the other end portion 7b of the first internal electrode 7 exposed to the second side surface 23 of the ceramic laminate 2, so that from the second side surface 23 of the ceramic laminate 2 to the inside thereof, a Ni—Mg—O segregation region is generated and grown in a region including a predetermined length which is within the range of the NiO region of the other end portion 7b of the first internal electrode 7. As a result, the other end portion 7b of the first internal electrode 7 includes metal phases of a Ni region 74b, a Ni—O region 76b, and a Ni—Mg—O region 78b disposed in this order from the first internal electrode 7 side to the second side surface 23.

In addition, Mg contained in the second covering ceramic dielectric layer 16 reacts with NiO of the end surface of the other end portion 8b of the second internal electrode 8 exposed to the second side surface 23 of the ceramic laminate 2, so that from the second side surface 23 of the ceramic laminate 2 to the inside thereof, a Ni—Mg—O segregation region is generated and grown in a region including a predetermined length which is within the range of the NiO region of the other end portion 8b of the second internal electrode 8. As a result, the other end portion 8b of the second internal electrode 8 includes metal phases of a Ni region 84b, a Ni—O region 86b, and a Ni—Mg—O region 88b disposed in this order from the second internal electrode 8 side to the second side surface 23.

Since Mg contained in the first covering ceramic dielectric layer 15 is partially transferred to the one end portion 7a of the first internal electrode 7 and the one end portion 8a of the second internal electrode 8, and since Mg contained in the second covering ceramic dielectric layer 16 is partially transferred to the other end portion 7b of the first internal electrode 7 and the other end portion 8b of the second internal electrode 8, the contents of Mg contained in the first covering ceramic dielectric layer 15 and the second covering ceramic dielectric layer 16 are decreased, and the insulating reliability of the gap W1 defined by the first covering ceramic dielectric layer 15 and that of the gap W2 defined by the second covering ceramic dielectric layer 16 are improved.

Next, the underlayer electrode layer 40 of the first external electrode 4 is formed on the one end portion of the ceramic laminate 2, and the underlayer electrode layer 50 of the second external electrode 5 is formed on the other end portion of the ceramic laminate 2. The step of forming the external electrodes will be described in more detail. By firing, for example, when the first internal electrode 7 is contracted, and the lead electrode portion 72 of the first internal electrode 7 is not exposed to the first end surface 24 of the ceramic laminate 2, the first end surface 24 is polished before the first external electrode 4 and the second external electrode 5 are formed, so that an end surface of the lead electrode portion 72 is exposed to the first end surface 24.

An electrically conductive paste is flatly applied on a table, so that an electrically conductive paste layer is formed. Subsequently, the ceramic laminate 2 is held so that the first end surface 24 to which the lead electrode portion 72 of the first internal electrode 7 is exposed faces the electrically conductive paste layer. As a holding method, the first side surface 22 and the second side surface 23, which face each other, of the ceramic laminate 2 may be sandwiched by an elastic body, or the other second end surface 25 of the ceramic laminate 2 may be held by a holding plate using an adhesive. The end portion of the ceramic laminate 2 is dipped in the electrically conductive paste, so that the first end surface 24 is covered with the electrically conductive paste. In addition, the first end surface 24 covered with the electrically conductive paste may be pressed to a flat plate on which no electrically conductive paste layer is formed so as to remove an excessive portion of the electrically conductive paste covering the first end surface 24. In addition, the end portion of the ceramic laminate 2 may be dipped in the electrically conductive paste at least two times. In addition, when the electrically conductive paste is excessively wettable to the ceramic laminate 2, a treatment to repel the electrically conductive paste is performed thereon in advance so as to prevent the excessive wettability. As is the case described above, the other second end surface 25 of the ceramic laminate 2 is covered with the electrically conductive paste.

After the ceramic laminate 2 including the two end portions to which the electrically conductive paste is adhered is dried, the electrically conductive paste is fired onto the surfaces of the ceramic laminate 2 at a temperature of approximately 700° C. to approximately 950° C. As described above, the underlayer electrode layer 40 covering the first end surface 24 of the ceramic laminate 2 and the underlayer electrode layer 50 covering the second end surface 25 thereof are formed.

Next, the plating layer 42 is formed on the surface of the underlayer electrode layer 40, and the plating layer 52 is formed on the underlayer electrode layer 50. More particularly, in a plating solution filled in a plating bath, a plating voltage is applied between a cathode and an anode in the state in which the cathode is set in contact with the underlayer electrode layer 40 and the underlayer electrode layer 50, each of which is formed in the ceramic laminate 2, so that the plating layer 42 is precipitated on the surface of the underlayer electrode layer 40, and the plating layer 52 is also precipitated on the surface of the underlayer electrode layer 50. Alternatively, after an electrically conductive medium is placed in the plating bath together with the ceramic laminate 2, a current may be allowed to flow through the underlayer electrode layer 40 and the underlayer electrode layer 50 of the ceramic laminate 2 using the electrically conductive medium. As a method to allow a current to flow, various methods may be used, and for example, there may be mentioned a vibration plating method in which plating is performed while at least one ceramic laminate 2 and the electrically conductive medium are stirred by vibration, a rotation barrel plating method in which plating is performed while the electrically conductive medium and at least one ceramic laminate 2 placed in a barrel are stirred by rotation, or a centrifugal plating method in which plating is performed by stirring at least one ceramic laminate 2 by a centrifugal force of a barrel.

In addition, the present invention is not limited to the preferred embodiments described above and may be variously modified within the scope of the present invention.

Experimental Examples

1. Formation of Evaluation Samples

Experimental examples of the multilayer ceramic capacitor 1 were formed using the manufacturing method described above under the following conditions.

(a) Design Conditions

Size of the ceramic laminate 2: 1.0 mm×0.5 mm×0.5 mm.

Material of the ceramic dielectric layer 10: a ceramic dielectric containing $BaTiO_3$ as a primary component was used.

Material of the covering ceramic dielectric green sheet: a ceramic dielectric was used which had the same composition system as that of the ceramic dielectric of the ceramic dielectric layer 10 in which the Mg content with respect to 100 of Ti was changed as shown in Table 1, so that five types of multilayer ceramic capacitors 1 were formed.

Thickness of the ceramic dielectric layer 10: 1.0 μm

Material of the first internal electrode 7 and the second internal electrode 8: Ni Thickness of each of the first internal electrode 7 and the second internal electrode 8: 0.6 μm Material of the first external electrode 4 and the second external electrode 5: Cu Thickness of each of the first external electrode 4 and the second external electrode 5: 40 μm (b) Manufacturing Conditions Firing temperature of the ceramic laminate 2: Firing was performed at a maximum temperature of 1,185° C., and a time for traveling from an inlet to an outlet of a firing furnace was 20 minutes.

Firing atmosphere of the ceramic laminate 2: a reducing atmosphere.

Firing temperature of the first external electrode 4 and the second external electrode 5: Firing was performed at a maximum temperature of 850° C., and a time for traveling from an inlet to an outlet of a firing furnace was 1 hour.

Firing atmosphere of the first external electrode 4 and the second external electrode 5: a reducing atmosphere.

2. Evaluation Items and Evaluation Methods (a) Structural Defect

After a WT cross-section passing through the center of the ceramic laminate 2 was exposed by polishing and was then observed by a scanning electron microscope (SEM), the presence or absence of microcracks were confirmed. When at least one microcrack was observed, the result was evaluated as x, and when no cracks were observed, the result was evaluated as ○. The number of test pieces was 3.

(b) Reliability

After a highly accelerated life test (HALT) was performed in a temperature region of 150° C. at a voltage of 16 V, the reliability was evaluated by a Weibull plot of the resistance. When degradation in reliability is confirmed in at least one test piece, the result was evaluated as x, and when no degradation was confirmed in all test pieces, the result was evaluated as ○. The number of test pieces was 18.

3. Evaluation Results

As shown in Table 1, in all the evaluation samples, it was confirmed that the generation of microcracks was significantly reduced or prevented. In addition, in the case of the multilayer ceramic capacitor 1 of evaluation sample No. 1, since the Mg content of the ceramic dielectric green sheet was 0.0 percent by mole, insufficient sintering of the first covering ceramic dielectric layer 15 and the second covering ceramic dielectric layer 16 occurred, and the degradation in reliability was confirmed. Furthermore, in the case of the multilayer ceramic capacitor 1 of evaluation sample No. 5, since the Mg content of the covering ceramic dielectric green sheet was 2.5 percent by mole, the degradation in insulating resistance (IR) was confirmed. Hence, it was confirmed that as the covering ceramic dielectric green sheet which was the material of the first covering ceramic dielectric layer 15 and the second covering ceramic dielectric layer 16, a sheet containing as a subcomponent, more than 0.0 to less than 2.5 percent by mole of an Mg compound was preferably used.

TABLE 1

| Evaluation Sample Number | Mg Content of Covering Ceramic Dielectric Green Sheet [mol %] | Structural Defect (Microcrack) | Reliability |
|---|---|---|---|
| No. 1 | 0.0 | ○ | X |
| No. 2 | 1.0 | ○ | ○ |
| No. 3 | 1.5 | ○ | ○ |
| No. 4 | 2.0 | ○ | ○ |
| No. 5 | 2.5 | ○ | X |

In addition, the present invention is not limited to the preferred embodiments described above and may be variously modified within the scope thereof.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a ceramic laminate in which a plurality of ceramic dielectric layers each including a surface on which a first internal electrode is provided, a plurality of ceramic dielectric layers each including a surface on which a second internal electrode is provided, and a plurality of ceramic dielectric layers provided with no internal electrodes, are laminated to each other, the ceramic laminate including a first main surface and a second main surface facing each other in a lamination direction, a first side surface and a second side surface facing each other in a width direction perpendicular or substantially perpendicular to the lamination direction, and a first end surface and a second end surface facing each other in a length direction perpendicular or substantially perpendicular to the lamination direction and the width direction;
in the width direction of the ceramic laminate, a first covering ceramic dielectric layer provided on the first side surface of the ceramic laminate to which one end portion of the first internal electrode and one end portion of the second internal electrode are exposed and a second covering ceramic dielectric layer provided on the second side surface of the ceramic laminate to which the other end portion of the first internal electrode and the other end portion of the second internal electrode are exposed; and
a first external electrode provided on the first end surface of the ceramic laminate to which the first internal electrode is exposed and a second external electrode provided on the second end surface of the ceramic laminate to which the second internal electrode is exposed; wherein
the first internal electrode and the second internal electrode face each other with the corresponding ceramic dielectric layer interposed therebetween;
in the width direction of the ceramic laminate, the one end portion of the first internal electrode includes metal phases of Ni, Ni—O, and Ni—Mg—O arranged in this order from a first internal electrode side to the first side surface of the ceramic laminate, and the other end portion of the first internal electrode includes metal phases of Ni, Ni—O, and Ni—Mg—O arranged in this order from the first internal electrode side to the second side surface of the ceramic laminate; and
in the width direction of the ceramic laminate, the one end portion of the second internal electrode includes metal phases of Ni, Ni—O, and Ni—Mg—O arranged in this order from a second internal electrode side to the first side surface of the ceramic laminate, and the other end portion of the second internal electrode includes metal phases of Ni, Ni—O, and Ni—Mg—O arranged in this order from the second internal electrode side to the second side surface of the ceramic laminate.

2. The multilayer ceramic capacitor according to claim 1, wherein in the width direction of the ceramic laminate, the one end portion of the first internal electrode and the one end portion of the second internal electrode are each located within a displacement of approximately 5 μm or less along the lamination direction, and the other end portion of the first internal electrode and the other end portion of the second internal electrode are each located within a displacement of approximately 5 μm or less along the lamination direction.

3. The multilayer ceramic capacitor according to claim 1, wherein corner portions of the ceramic laminate are rounded.

4. The multilayer ceramic capacitor according to claim 1, wherein a size of the ceramic laminate is approximately 0.2 mm to approximately 0.8 mm in the lamination direction, approximately 0.2 mm to approximately 1.6 mm in the length direction, and approximately 0.2 mm to approximately 0.8 mm in the width direction.

5. The multilayer ceramic capacitor according to claim 1, wherein in the length direction of the ceramic laminate, a gap is provided between a counter electrode portion of the first internal electrode and the second end surface.

6. The multilayer ceramic capacitor according to claim 1, wherein in the length direction of the ceramic laminate, a gap is provided between a counter electrode portion of the second internal electrode and the first end surface.

7. The multilayer ceramic capacitor according to claim 1, wherein the one end portion of the first internal electrode and the one end portion of the second internal electrode each extend from the first side surface of the ceramic laminate to a distance of approximately 10 μm toward an inside thereof.

8. The multilayer ceramic capacitor according to claim 1, wherein the other end portion of the first internal electrode and the other end portion of the second internal electrode each extend from the second side surface of the ceramic laminate to a distance of approximately 10 μm toward an inside thereof.

9. The multilayer ceramic capacitor according to claim 1, wherein lengths of regions include the Ni—Mg—O are each approximately 0.5 μm to approximately 1 μm.

10. The multilayer ceramic capacitor according to claim 1, wherein the first internal electrode and the second internal electrode each include dielectric particles.

11. The multilayer ceramic capacitor according to claim 1, wherein a thickness of each of the first internal electrode and the second internal electrode is approximately 0.3 μm to approximately 2.0 μm.

12. The multilayer ceramic capacitor according to claim 1, wherein the ceramic laminate includes a total number of the first internal electrode and the second internal electrode of approximately 50 to approximately 850.

13. The multilayer ceramic capacitor according to claim 1, wherein a thickness of each of the first covering ceramic dielectric layer and the second covering ceramic dielectric layer is approximately 5 μm to approximately 40 μm.

14. The multilayer ceramic capacitor according to claim 1, wherein each of the first external electrode and the second external electrode layer includes an underlayer electrode layer and a plating layer.

15. The multilayer ceramic capacitor according to claim 14, wherein the underlayer electrode layer includes at least one of a fired layer, a resin layer, and a thin-film layer.

16. The multilayer ceramic capacitor according to claim 14, wherein the plating layer includes a plurality of layers.

17. The multilayer ceramic capacitor according to claim 14, wherein the plating layer includes a Ni plating layer and a Sn plating layer.

18. The multilayer ceramic capacitor according to claim 1, wherein
the first internal electrode and the second internal electrode each include Ni; and
the first covering ceramic dielectric layer and the second covering ceramic dielectric layer each include Mg.

* * * * *